United States Patent
Ueno et al.

(10) Patent No.: US 10,101,953 B2
(45) Date of Patent: Oct. 16, 2018

(54) PRINTING SYSTEM INCLUDING INFORMATION PROCESSING TERMINAL WITH ALTERNATIVE PRINTING APPARATUS DETERMINATION SECTION, PRINTING APPARATUS WITH ALTERNATIVE PRINTING APPARATUS DETERMINATION SECTION, INFORMATION PROCESSING TERMINAL, AND NON-TRANSITORY COMPUTER READABLE MEDIUM

(71) Applicant: SEIKO EPSON CORPORATION, Tokyo (JP)

(72) Inventors: Taichi Ueno, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/634,112

(22) Filed: Jun. 27, 2017

(65) Prior Publication Data

US 2018/0060005 A1    Mar. 1, 2018

(30) Foreign Application Priority Data

Aug. 26, 2016    (JP) .................................. 2016-165510

(51) Int. Cl.
*G06F 15/00* (2006.01)
*G06F 1/00* (2006.01)
(Continued)

(52) U.S. Cl.
CPC ............ *G06F 3/1261* (2013.01); *G06F 3/121* (2013.01); *G06F 3/1235* (2013.01);
(Continued)

(58) Field of Classification Search
CPC ...... G06F 3/1261; G06F 3/121; G06F 3/1235; G06F 3/1292; H04N 1/00204; H04N 1/32122; H04N 2201/0039; H04N 2201/0055; H04N 2201/0094; H04W 4/008; H04W 84/12
(Continued)

(56) References Cited

U.S. PATENT DOCUMENTS

2012/0281252 A1* 11/2012 Chen .................... G06F 3/1214
358/1.15
2014/0355022 A1* 12/2014 Oda ................... H04N 1/00214
358/1.13

FOREIGN PATENT DOCUMENTS

JP    2012-056117 A    3/2012

* cited by examiner

*Primary Examiner* — Douglas Tran

(57) ABSTRACT

A printing system includes an information processing terminal and a printing apparatus. The printing apparatus includes: a distance calculation section that calculates respective distances between the printing apparatus and other printing apparatuses and a distance information transmitting section that transmits distance information indicating the distances calculated by the distance calculation section to the information processing terminal. The information processing terminal includes: a distance information receiving section that receives the distance information; and an alternative printing apparatus determination section that determines which of the other printing apparatuses is to be used as an alternative printing apparatus determination section that performs a printing process instead of the printing apparatus on the basis of the distance information received by the distance information receiving section.

12 Claims, 8 Drawing Sheets

(51) Int. Cl.
- *G06K 1/00* (2006.01)
- *G06K 15/00* (2006.01)
- *G06F 3/12* (2006.01)
- *H04W 4/80* (2018.01)
- *H04N 1/00* (2006.01)
- *H04N 1/32* (2006.01)
- *H04W 84/12* (2009.01)

(52) U.S. Cl.
CPC ....... *G06F 3/1292* (2013.01); *H04N 1/00204* (2013.01); *H04N 1/32122* (2013.01); *H04W 4/80* (2018.02); H04N 2201/0039 (2013.01); H04N 2201/0055 (2013.01); H04N 2201/0094 (2013.01); H04W 84/12 (2013.01)

(58) Field of Classification Search
USPC .............................. 358/1.1, 1.14, 1.15, 1.13
See application file for complete search history.

FIG. 3

| AD | D3 | D4 | D5 | D6 |
|---|---|---|---|---|
| TRANSMISSION SOURCE ADDRESS | INDIVIDUAL IDENTIFICATION INFORMATION REGARDING PRINTING APPARATUS 20 | CAPABILITY INFORMATION REGARDING PRINTING APPARATUS 20 | ENABLED/ DISABLED INFORMATION REGARDING PRINTING APPARATUS 20 | SIGNAL STRENGTH VALUE FOR USE AS REFERENCE DISTANCE |

PRINTING SYSTEM INCLUDING INFORMATION PROCESSING TERMINAL WITH ALTERNATIVE PRINTING APPARATUS DETERMINATION SECTION, PRINTING APPARATUS WITH ALTERNATIVE PRINTING APPARATUS DETERMINATION SECTION, INFORMATION PROCESSING TERMINAL, AND NON-TRANSITORY COMPUTER READABLE MEDIUM

BACKGROUND

1. Technical Field

The present invention relates to a printing system, a printing apparatus, an information processing terminal, and a non-transitory computer readable medium.

2. Related Art

JP-A-2012-56117 discloses an example of known printing systems. When a printing apparatus receives a print request but fails to perform a printing process due to paper or ink depletion or an occurrence of hardware trouble, this printing system determines which of other printing apparatuses is to be used as an alternative printing apparatus and then causes this alternative printing apparatus to perform the printing process instead of the defective printing apparatus.

SUMMARY

In the printing system, however, the alternative printing apparatus determined in this manner is not always convenient for a user, because this determination does not take account of the respective distances between the defective printing apparatus and the other printing apparatuses. As a result, for example, the alternative printing apparatus may be far away from the user.

An advantage of some aspects of the invention is that, when a printing apparatus receives a print request but fails to perform a printing process due to paper or ink depletion or an occurrence of hardware trouble, a printing system determines an alternative printing apparatus that is convenient for a user and causes this alternative printing apparatus to perform the printing process instead of the defective printing apparatus.

According to a first aspect of the invention, a printing system includes: an information processing terminal; and a printing apparatus connected to the information processing terminal over a network. The printing apparatus includes: a broadcast signal receiving section that receives broadcast signals transmitted from other printing apparatuses through short distance wireless communication; a distance calculation section that calculates respective distances between the printing apparatus and the other printing apparatuses, on the basis of reception strengths of the broadcast signals received by the broadcast signal receiving section; and a distance information transmitting section that transmits distance information indicating the distances calculated by the distance calculation section to the information processing terminal. The information processing terminal includes: a distance information receiving section that receives the distance information transmitted from the distance information transmitting section; an alternative printing apparatus determination section that determines which of the other printing apparatuses is to be used as an alternative printing apparatus that performs a printing process instead of the printing apparatus, on the basis of the distance information received by the distance information receiving section; and a print job transmitting section that transmits a print job to the alternative printing apparatus determined by the alternative printing apparatus determination section.

The first aspect of the invention provides a printing system in which, even if a printing apparatus receives a print request from an information processing terminal but fails to perform a printing process due to paper or ink depletion or an occurrence of hardware trouble, the information processing terminal can determine which of other printing apparatuses is the most convenient for a user, then designate the determined printing apparatus as an alternative printing apparatus, and transmit a printing request (print job) to the determined alternative printing apparatus.

More specifically, the alternative printing apparatus determination section in the information processing terminal determines which of other printing apparatuses is to be used as the alternative printing apparatus on the basis of distance information received by the distance receiving section. The distance information indicates respective distances between the other printing apparatuses and the printing apparatus that receives a print request from the information processing terminal. These distances are calculated by the distance calculation section in the printing apparatus. Then, the alternative printing apparatus performs a printing process instead of the printing apparatus that has received the print request from the information processing terminal.

The information processing terminal preferably includes a Wi-Fi connection section that establishes Wi-Fi connection, and a BLE connection section that establishes BLE connection. The Wi-Fi connection section preferably attempts to establish Wi-Fi connection to the alternative printing apparatus determined by the alternative printing apparatus determination section. The BLE connection section preferably attempts to establish BLE connection to the alternative printing apparatus if the Wi-Fi connection section fails to establish Wi-Fi connection to the alternative printing apparatus. If Wi-Fi connection to the alternative printing apparatus is successfully established, the print job transmitting section preferably transmits the print job to the alternative printing apparatus through Wi-Fi communication. If BLE connection to the alternative printing apparatus is successfully established, the print job transmitting section preferably transmits the print job to the alternative printing apparatus through BLE communication.

With the above configuration, when Wi-Fi connection to an alternative printing apparatus is successfully established, an information processing terminal can cause the alternative printing apparatus to perform a printing process by transmitting a print job to the alternative printing apparatus through Wi-Fi communication. Even when establishing Wi-Fi connection to the alternative printing apparatus fails because the alternative printing apparatus and the information processing terminal are not present on the same network, for example, the information processing terminal can cause the alternative printing apparatus to perform a printing process by transmitting a print job to the alternative printing apparatus through BLE communication.

The alternative printing apparatus determination section in the information processing terminal preferably determines which of the other printing apparatuses has the shortest distance to the printing apparatus and designates the determined printing apparatus as the alternative printing apparatus.

Even if a printing apparatus receives a print request from an information processing terminal but fails to perform a printing process due to paper or ink depletion or an occurrence of hardware trouble, the information processing terminal can determine which of other printing apparatus is the most convenient for a user, more specifically, which of other printing apparatus has the shortest distance to the printing apparatus that has received the print request from the information processing terminal. Then, the information processing terminal can cause the alternative printing apparatus to perform the printing process by transmitting a print job to the alternative printing apparatus.

Each of the broadcast signals transmitted by the other printing apparatuses preferably contains capability information that indicates a capability of a corresponding one of the other printing apparatuses. The printing apparatus preferably includes a capability information transmitting section that transmits the capability information contained in each broadcast signal to the information processing terminal. The information processing terminal preferably includes a capability information receiving section that receives the capability information transmitted from the capability information transmitting section. The alternative printing apparatus determination section preferably identifies a cluster of some of the other printing apparatuses which have the greatest capability on the basis of the capability information, then determines which of the other printing apparatuses included in the cluster has the shortest distance to the printing apparatus, and designates the determined printing apparatus as the alternative printing apparatus.

With this configuration, even if a printing apparatus receives a print request from an information processing terminal but fails to perform a printing process due to paper or ink depletion or an occurrence of hardware trouble, a printing system can select other printing apparatuses that are convenient for a user, more specifically, have the greatest capability, and can determine which of the selected printing apparatuses has the shortest distance to the printing apparatus. Then, the printing system can designate the determined printing apparatus as an alternative printing apparatus and transmit a printing request (print job) to the determined alternative printing apparatus.

Each of the broadcast signals transmitted by the other printing apparatuses preferably contains capability information that indicates a capability of a corresponding one of the other printing apparatuses. The printing apparatus preferably includes a capability information transmitting section that transmits the capability information contained in each broadcast signal to the information processing terminal. The information processing terminal preferably includes a capability information receiving section that receives the capability information transmitted from the capability information transmitting section. The alternative printing apparatus determination section preferably identifies a cluster of some of the other printing apparatuses which have the greatest capabilities on the basis of the capability information. Then, the alternative printing apparatus determination section preferably provides a user with a list of some of the other printing apparatuses included in the cluster whose distances to the printing apparatus are shorter than a predetermined distance. The alternative printing apparatus determination section preferably designates one of the other printing apparatuses in the provided list which is selected by a user's operation, as the alternative printing apparatus.

With this configuration, even if a printing apparatus receives a print request from an information processing terminal but fails to perform a printing process due to paper or ink depletion or an occurrence of hardware trouble, a printing system can determine which of other printing apparatuses in a list is the most convenient for a user in accordance with a user's selection. Then, the printing system can designate the determined printing apparatus as an alternative printing apparatus and transmit a printing request (print job) to the determined alternative printing apparatus.

The distance calculation section in the printing apparatus preferably calculates the respective distances between the printing apparatus and the other printing apparatuses on the basis of the reception strengths of the broadcast signals received by the broadcast signal receiving section and a reference reception strength of the broadcast signals.

With this configuration, a distance calculation section in a printing apparatus calculates respective distances between the printing apparatus that has received a print request from the information processing terminal and other printing apparatuses, on the basis of the reception strengths of broadcast signals received by a broadcast signal receiving section in the printing apparatus and a reference reception strength contained in the broadcast signals.

The short distance wireless communication is preferably communication conforming to Bluetooth Low Energy.

With this configuration, a broadcast signal receiving section in a printing apparatus that has received a print request from an information processing terminal can receive broadcast signals from other printing apparatuses that are present near this printing apparatus through communication (BLE communication) conforming to Bluetooth Low Energy. Then, on the basis of the reception strengths of the broadcast signals received by the information processing terminal, the printing apparatus that has received a print request can calculate respective distances between the printing apparatus itself and the other printing apparatuses.

According to a second aspect of the invention, a printing apparatus, if failing to perform a printing process based on a print job received from an information processing terminal, causes one of other printing apparatuses to perform the printing process instead of the printing apparatus itself. The printing apparatus includes a broadcast signal receiving section that receives broadcast signals transmitted from the other printing apparatuses through short distance wireless communication. A distance calculation section calculates respective distances between the printing apparatus itself and the other printing apparatuses, on the basis of reception strengths of the broadcast signals received by the broadcast signal receiving section. An alternative printing apparatus determination section determines which of the other printing apparatuses is to be used as an alternative printing apparatus that performs the printing process instead of the printing apparatus itself, on the basis of distance information indicating the distances calculated by the distance calculation section. A print job transmitting section transmits a print job to the alternative printing apparatus determined by the alternative printing apparatus determination section.

The second aspect of the invention provides a printing apparatus that, if a printing apparatus receives a print request from an information processing terminal but fails to perform a printing process due to paper or ink depletion or an occurrence of hardware trouble, can determine which of other printing apparatuses is the most convenient for a user, then designate the determined printing apparatus as an alternative printing apparatus, and transmit a printing request (print job) to the determined alternative printing apparatus.

According to a third aspect of the invention, an information processing terminal includes a distance information receiving section that receives distance information indicating respective distances between a printing apparatus and other printing apparatuses; the distance information is transmitted from the printing apparatus. An alternative printing apparatus determination section determines which of the other printing apparatuses is to be used as an alternative printing apparatus that performs a printing process instead of the printing apparatus, on the basis of the distance information received by the distance information receiving section. A print job transmitting section transmits a print job to the alternative printing apparatus determined by the alternative printing apparatus determination section.

The third aspect of the invention provides an information processing terminal that, if a printing apparatus receives a print request from an information processing terminal but fails to perform a printing process due to paper or ink depletion or an occurrence of hardware trouble, can determine which of other printing apparatuses is the most convenient for a user, then designate the determined printing apparatus as an alternative printing apparatus, and transmit a printing request (print job) to the determined alternative printing apparatus.

According to a fourth aspect of the invention, a non-transitory computer readable medium stores a program thereon which causes an information processing terminal that communicates with a printing apparatus to function as a distance information receiving section, an alternative printing apparatus determination section, and a print job transmitting section. The distance information receiving section receives distance information indicating respective distances between the printing apparatus and other printing apparatuses; the distance information is transmitted from the printing apparatus. The alternative printing apparatus determination section determines which of the other printing apparatuses is to be used as an alternative printing apparatus that performs a printing process instead of the printing apparatus, on the basis of the distance information received by the distance information receiving section. The print job transmitting section transmits a print job to the alternative printing apparatus determined by the alternative printing apparatus determination section.

The fourth aspect of the invention can provide a non-transitory computer readable medium on which a program is stored. If a printing apparatus receives a print request from an information processing terminal but fails to perform a printing process due to paper or ink depletion or an occurrence of hardware trouble, the program causes an information processing terminal to determine which of other printing apparatuses is the most convenient for a user, then to designate the determined printing apparatus as an alternative printing apparatus, and to transmit a printing request (print job) to the determined alternative printing apparatus.

BRIEF DESCRIPTION OF THE DRAWINGS

The invention will be described with reference to the accompanying drawings, wherein like numbers reference like elements.

FIG. 3 is a diagram illustrating an example of a configuration of an advertising packet that each printing apparatus (first wireless communication section) transmits or receives through BLE communication.

DESCRIPTION OF EXEMPLARY EMBODIMENTS

Figure 1:
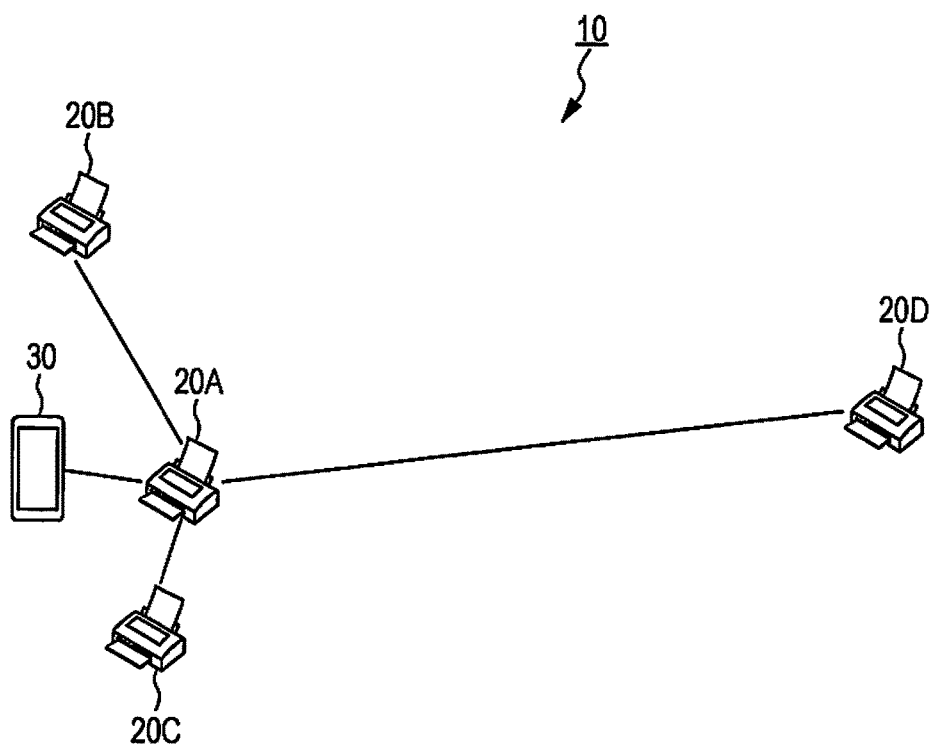
FIG. 1 is a view of an example of a system configuration of a printing system, which incorporates a printing system, a printing apparatus, an information processing terminal, and a non-transitory computer readable medium in an embodiment of the invention.

Some embodiments of the invention will be described below with reference to the accompanying drawings. The same constituent elements are given identical reference numerals across the drawings and will not be described redundantly.

FIG. 1 is a view of an example of a system configuration of a printing system 10, which incorporates a printing system, a printing apparatus, an information processing terminal, and a non-transitory computer readable medium in the invention.

As illustrated in FIG. 1, the printing system 10 in this embodiment includes printing apparatuses 20 (20A to 20D), and an information processing terminal 30, which are interconnected via a network so as to be able to communicate with one another. The network may be either a wireless or wired network. In this example, however, a wireless network is used as the network.

Each of the printing apparatuses 20A to 20D is an ink jet printer. However, each of the printing apparatuses 20A to 20D is not limited to a specific type of printer. As an alternative example, each of the printing apparatuses 20A to 20D may be an MFP (multifunction peripheral) that incorporates the functions of a printer and one or more of a scanner, a copy machine, and a facsimile machine. Furthermore, each of the printing apparatuses 20A to 20D may be either a mobile printer that operates on electricity supplied from its built-in battery or a stationary printer that operates on electricity supplied from a commercial power source. Hereinafter, any of the printing apparatuses 20A to 20D may also be represented as a printing apparatus 20, because the printing apparatuses 20A to 20D have substantially the same configuration.

In the case where a printing apparatus 20 receives a print request but fails to perform a print operation, the printing system 10 causes another printing apparatus 20, which will be referred to below as an alternative printing apparatus 20, to perform a print operation instead. Examples of a case where a printing apparatus 20 fails to perform a print operation include a case where ink or paper is used up and a case where hardware trouble occurs. In this case, the alternative printing apparatus 20 is selected from printing apparatuses 20 positioned near the defective printing apparatus 20. These printing apparatuses 20 will be referred to below as other printing apparatuses 20. In the printing system 10, the information processing terminal 30 transmits a print request to the printing apparatuses 20 via the wireless network (wireless LAN (local area network)) including a relay 50 (AP (access point)) (see FIG. 2).

Figure 2:
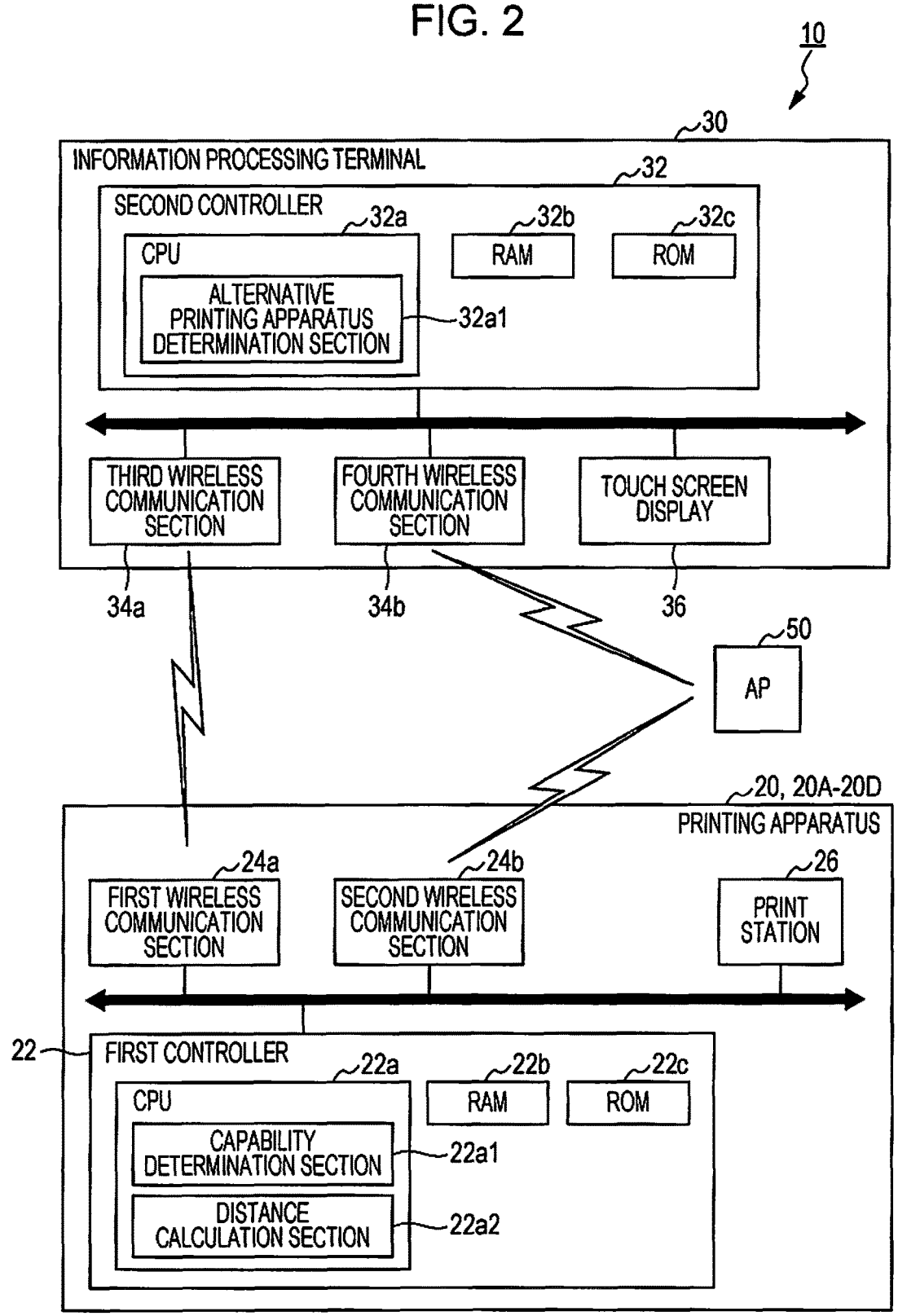
FIG. 2 is a diagram illustrating an example of hardware configurations of each printing apparatus and the information processing terminal.

FIG. 2 is a diagram illustrating an example of hardware configurations of each printing apparatus 20 and the information processing terminal 30.

As illustrated in FIG. 2, each printing apparatus 20 includes a first controller 22, a first wireless communication section 24a, a second wireless communication section 24b, and a print station 26, as main hardware components.

The first controller 22 includes a CPU 22a, RAM 22b, and ROM 22c.

The first controller 22 (CPU 22a) executes predetermined programs, including a control program, read from the ROM 22c, thereby controlling the entire operation of the printing apparatus 20. The RAM 22b is used as a work area when the CPU 22a performs various arithmetic processes. For example, the ROM 22c may be a rewritable, nonvolatile memory such as flash ROM and may store firmware such as the control program.

The first wireless communication section 24a conducts wireless communication in conformity with BLE (Bluetooth Low Energy), which will be referred to below as BLE communication. For example, the first wireless communication section 24a may be implemented using a BLE chip, such as a controller, or a BLE module.

The first wireless communication section 24a in one printing apparatus 20 transmits or broadcasts advertising packets to the other printing apparatus 20 at regular intervals. Each of these advertising packets contains individual identification information, capability information, and enabled/disabled information regarding the printing apparatus 20 itself and a signal strength value for use as a reference distance. Herein, the advertising packet corresponds to a broadcast signal, and BLE communication corresponds to short distance wireless communication. The type of the advertising packet may be ADV_IND for use in establishing a connection, for example.

Moreover, the first wireless communication section 24a in the one printing apparatus 20 receives and collects advertising packets transmitted from the other printing apparatuses 20 through BLE communication. In this case, the first wireless communication section 24a corresponds to a broadcast signal receiving section herein. The received advertising packets are stored in the RAM 22b or any other storage section in the printing apparatus 20.

FIG. 3 is a diagram illustrating an example of a configuration of an advertising packet that each printing apparatus 20 (first wireless communication section 24a) transmits or receives through BLE communication. It should be noted that a header is not described in the configuration of FIG. 3.

As illustrated in FIG. 3, the advertising packet that a printing apparatus 2 (first wireless communication section 24a) transmits or receives through BLE communication contains: a transmission source address AD; individual identification information D3 regarding the printing apparatus 20; capability information D4 regarding the printing apparatus 20; enabled/disabled information D5 regarding the printing apparatus 20; and signal strength value D6 for use as a reference distance.

The transmission source address AD is the Bluetooth device address (BD_ADDR) of the printing apparatus 20 serving as a transmission source for the advertising packet.

The individual identification information D3 regarding the printing apparatus 20 is identification information for use in uniquely identifying the printing apparatus 20 as a transmission source for the advertising packet. As an example, the individual identification information D3 may be a MAC address.

The capability information D4 regarding the printing apparatus 20 is information regarding the latest capability of the printing apparatus 20 serving as a transmission source for the advertising packet. This capability is determined by a capability determination section 22a1, which will be described below. As an example, the capability information D4 may be bits (or a bit string) indicating "high-performance printer", "medium-performance printer", and "low-performance printer".

The capability determination section 22a1 in a printing apparatus 20 assigns scores to the respective characteristics of the printing apparatus 20 itself. Then, the capability determination section 22a1 compares the total score assigned to the characteristics with first and second thresholds and determines the capability of the printing apparatus 20 itself on the basis of the comparison result. The function of the capability determination section 22a1 is realized by the first controller 22 (CPU 22a) executing a predetermined program, such as the control program, read from the ROM 22c.

As an example, a printing apparatus 20 supports: A3-, A4-, and postcard-size paper sheets; double-sided printing; color printing; high-speed printing; and high-resolution printing, as its characteristics.

First, the capability determination section 22a1 in this printing apparatus 20 assigns scores to the respective characteristics. For example, the capability determination section 22a1 may assign a score of 5 to the A3-, A4-, and postcard-size paper printing; a score of 5 to the double-sided printing; a score of 5 to the high-speed printing; and a score of 5 to the high-resolution printing.

Next, the capability determination section 22a1 in the printing apparatus 20 compares the total score assigned to the characteristics of the printing apparatus 20 itself with the first threshold, such as 20. If the total score assigned to the characteristics is more than the first threshold, the capability determination section 22a1 determines that the printing apparatus 20 itself is a "high-performance printer".

In this example, the total score of the characteristics is 25, which is more than the first threshold (20). As a result, the capability determination section 22a1 in the printing apparatus 20 determines that the printing apparatus 20 itself is a "high-performance printer".

Then, the first wireless communication section 24a in the printing apparatus 20 transmits the capability information D4 regarding the printing apparatus 20 itself to the other printing apparatuses 20 at regular intervals through BLE communication, as an advertising packet that contains bits (or a bit string) indicating "high-performance printer".

As another example, a printing apparatus 20 supports: A4-size paper sheets; and color printing; single-sided printing; medium-speed printing; and medium-resolution printing, as its characteristics.

First, the capability determination section 22a1 in this printing apparatus 20 assigns scores to the respective characteristics. For example, the capability determination section 22a1 may assign a score of 3 to the A4-size paper sheets; a score of 5 to the color printing; a score of 3 to the single-sided printing; a score of 3 to the medium-speed printing; and a score of 3 to the medium-resolution printing.

Next, the capability determination section 22a1 in the printing apparatus 20 compares the total score assigned to the characteristics of the printing apparatus 20 itself with both the first threshold, such as 20, and the second threshold, such as 15. If the total score assigned to the characteristics is more than the second threshold and less than the first threshold, the capability determination section 22a1 determines that the printing apparatus 20 itself is a "medium-performance printer".

In this example, the total score assigned to the characteristics is 17, which is more than the second threshold (15) and less than the first threshold (20). As a result, the capability determination section 22a1 in the printing apparatus 20 determines that the printing apparatus 20 itself is a "medium-performance printer".

Then, the first wireless communication section 24a in the printing apparatus 20 transmits the capability information D4 regarding the printing apparatus 20 itself to the other printing apparatuses 20 at regular intervals through BLE communication, as an advertising packet that contains bits (or a bit string) indicating "medium-performance printer".

As still another example, a printing apparatus 20 supports: A4-size paper sheets; and black-and-white printing; single-sided printing; low-speed printing; and low-resolution printing, as its characteristics.

First, the capability determination section 22a1 in this printing apparatus 20 assigns scores to the respective characteristics. For example, the capability determination section 22a1 may assign a score of 3 to the A4-size paper sheets; a score of 3 to the black-and-white printing; a score of 3 to the single-sided printing; a score of 1 to the low-speed printing; and a score of 1 to the low-resolution printing.

Next, the capability determination section 22a1 in the printing apparatus 20 compares the total score assigned to the characteristics of the printing apparatus 20 itself with both the first threshold, such as 20, and the second threshold, such as 15. If the total score of the characteristics is less than the second threshold, the capability determination section 22a1 determines that the printing apparatus 20 itself is a "low-performance printer".

In this example, the total score of the characteristics is 11, which is less than the second threshold (15). As a result, the capability determination section 22a1 in the printing apparatus 20 determines that the printing apparatus 20 itself is a "low-performance printer".

Then, the first wireless communication section 24a in the printing apparatus 20 transmits the capability information D4 regarding the printing apparatus 20 itself to the other printing apparatuses 20 at regular intervals through BLE communication, as an advertising packet that contains bits (or a bit string) indicating "low-performance printer".

In this way, the capability determination section 22a1 in the printing apparatus 20 determines the capability of the printing apparatus 20 itself.

The enabled/disabled information D5 regarding a printing apparatus 20 is made up of bits or a bit sequence indicating whether the printing apparatus 20 that has transmitted an advertising packet is available.

If it is detected that ink and paper are left in a printing apparatus 20, for example, the first wireless communication section 24a in this printing apparatus 20 transmits the enabled/disabled information D5 regarding the printing apparatus 20 itself to the other printing apparatuses 20 at regular intervals through BLE communication, as an advertising packet that contains bits (or a bit string) indicating that the printing apparatus 20 itself is available.

If it is detected that one or both of ink and paper are not left in a printing apparatus 20, for example, the first wireless communication section 24a in this printing apparatus 20 transmits the enabled/disabled information D5 regarding the printing apparatus 20 itself to the other printing apparatuses 20 at regular intervals through BLE communication, as an advertising packet that contains bits (or a bit string) indicating that the printing apparatus 20 itself is not available.

The signal strength value D6 for use as a reference distance indicates the strength of a signal received at a location that is a reference distance away from a transmission source. The signal strength value D6 for use as a reference distance is used to calculate the respective distances between the printing apparatus 20A and the individual printing apparatuses 20B to 20D. Details of a method of calculating the distances will be described later.

The second wireless communication section 24b in each printing apparatus 20 conducts wireless communication (referred to below as Wi-Fi communication) with the information processing terminal 30 in accordance with Wi-Fi (Wireless Fidelity) through the wireless network (wireless LAN) including the relay 50 (access point). For example, the second wireless communication section 24b may be implemented using a LAN chip, such as a controller, or a wireless LAN module.

The second wireless communication section 24b in each printing apparatus 20 receives a print job transmitted from the information processing terminal 30 (fourth wireless communication section 34b) through Wi-Fi communication. The second wireless communication section 24b in each printing apparatus 20 in turn transmits, to the information processing terminal 30 through Wi-Fi communication, information needed to select an alternative printing apparatus 20 that will perform a printing process instead of a defective printing apparatus 20. This information is referred to below as alternative printing apparatus determination information. Herein, the second wireless communication section 24b corresponds to a distance transmitting section (distance information transmitting section). In this case, the second wireless communication section 24b in each printing apparatus 20 transmits the alternative printing apparatus determination information at the timing when ink or paper is used up or hardware trouble occurs in each printing apparatus 20, namely, when the depletion of ink or paper or an occurrence of hardware trouble is detected.

Figure 4:
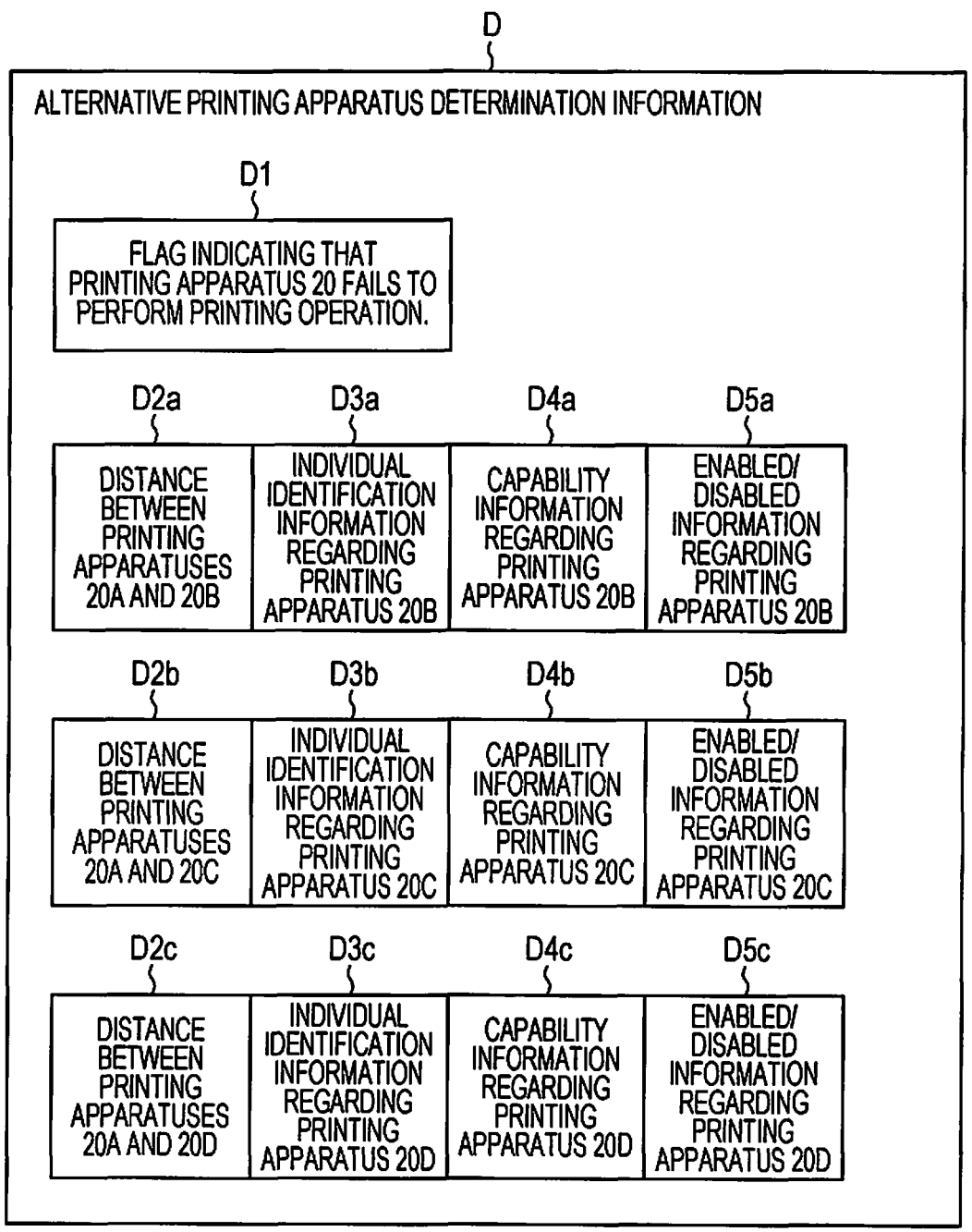
FIG. 4 is a diagram illustrating an example of a configuration of an alternative printing apparatus determination information that the printing apparatus (second wireless communication section) transmits to the information processing terminal through Wi-Fi communication when failing to perform a printing process.

FIG. 4 illustrates alternative printing apparatus determination information D which a printing apparatus 20A (second wireless communication section 24b) that has failed to perform a printing process transmits to the information processing terminal 30 through Wi-Fi communication.

As illustrated in FIG. 4, the alternative printing apparatus determination information D contains flag D1, distances (distance information) D2a to D2c, pieces of individual identification information D3a to D3c, pieces of capability information D4a to D4c, and pieces of enabled/disabled information D5a to D5c. More specifically, the flag D1 indicates that the printing apparatus 20A has failed to perform a printing process. The pieces of individual identification information D3a to D3c are used, respectively, to differentiate between the other printing apparatuses 20B to 20D. The distances D2a to D2c are related, respectively, to the pieces of individual identification information D3a to D3c and indicate the respective distances between the printing apparatuses 20A and 20B, between the printing apparatuses 20A and 20C, and between the printing apparatuses 20A and 20D.

The distance D2a between the printing apparatuses 20A and 20B, the distance D2b between the printing apparatuses 20A and 20C, and the distance D2c between the printing apparatuses 20A and 20D are calculated or estimated by a distance calculation section 22a2 in the printing apparatus 20A.

The distance calculation section 22a2 in the printing apparatus 20A calculates the distance D2a between the printing apparatuses 20A and 20B, the distance D2b between the printing apparatuses 20A and 20C, and the distance D2c between the printing apparatuses 20A and 20D. This calculation is based on the reception strength of the advertising packets (broadcast signals) that the first wireless communication section 24a in the printing apparatus 20A receives from the other printing apparatuses 20B to 20D through BLE communication. The function of the distance calculation section 22a2 is realized by the first controller 22 (CPU 22a) executing a predetermined program, such as a control program, read from the ROM 22c.

If the distance calculation section 22a2 in the printing apparatus 20A receives the advertising packets transmitted from the other printing apparatuses 20B to 20D through BLE communication, the distance calculation section 22a2 compares reception signal strengths RSSI (received signal strength indication) of the received advertising packets with signal strength values for use as a reference distance which are contained in the received advertising packets. On the basis of this comparison result, the distance calculation section 22a2 in the printing apparatus 20A calculates the distance D2a between the printing apparatuses 20A and 20B, the distance D2b between the printing apparatuses 20A and 20C, and the distance D2c between the printing apparatuses 20A and 20D. In this case, the signal strength value for use as a reference distance may be a reception signal strength RSSI of an advertising packet transmitted from a broadcaster and received by an observer; the broadcaster and the observer are a reference distance away from each other.

Figure 5:
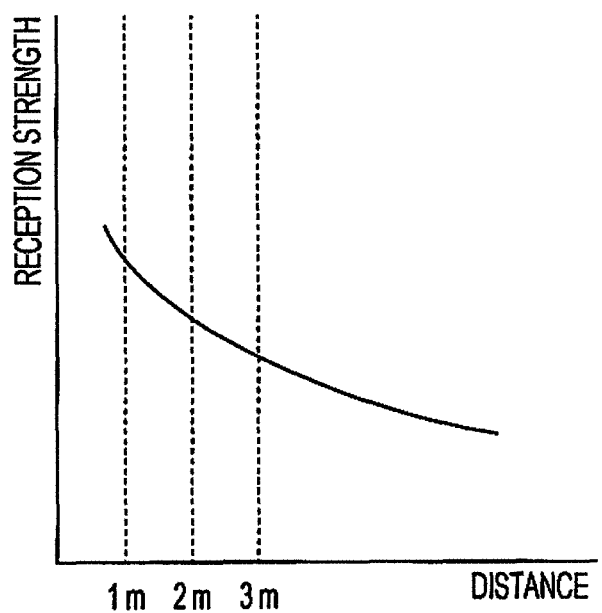
FIG. 5 is a graph showing the relationship between the distance between a transmission source for an advertising packet and a printing apparatus that receives the advertising packet and the reception strength of the advertising packet received by the first wireless communication section in the printing apparatus.

As an alternative example, the distance calculation section 22a2 in the printing apparatus 20A may calculate the distance D2a between the printing apparatuses 20A and 20B, the distance D2b between the printing apparatuses 20A and 20C, and the distance D2c between the printing apparatuses 20A and 20D in the following manner. The distance calculation section 22a2 in the printing apparatus 20A may store in advance the relationship (e.g., a characteristic curve illustrated in FIG. 5) between the distance from a transmission source for an advertising packet to a printing apparatus 20 that receives that advertising packet and the reception strength of the advertising packet, in the RAM 22b or any other storage section. Then, when receiving an advertising packet, the first wireless communication section 24a in the printing apparatus 20A may read the distance related to its reception strength from the RAM 22b or any other storage section. In this way, the distance calculation section 22a2 in the printing apparatus 20A may calculate the distance D2a between the printing apparatuses 20A and 20B, the distance D2b between the printing apparatuses 20A and 20C, and the distance D2c between the printing apparatuses 20A and 20D.

As another alternative example, the distance calculation section 22a2 in the printing apparatus 20A may calculate the distance D2a between the printing apparatuses 20A and 20B, the distance D2b between the printing apparatuses 20A and 20C, and the distance D2c between the printing apparatuses 20A and 20D in the following manner. The distance calculation section 22a2 in the printing apparatus 20A may make the calculation with a known method on the basis of: the reception strengths of advertising packets (broadcast signals) that the first wireless communication section 24a in the printing apparatus 20A receives from the other printing apparatuses 20B to 20D; and the signal strength values D6 for use as a reference distance which are contained in the advertising packets. Herein, each signal strength value D6 corresponds to a reference reception strength. In this way, the distance calculation section 22a2 in the printing apparatus 20A may calculate the distance D2a between the printing apparatuses 20A and 20B, the distance D2b between the printing apparatuses 20A and 20C, and the distance D2c between the printing apparatuses 20A and 20D. As still another alternative example, the printing apparatus 20A may calculate the distance D2a between the printing apparatuses 20A and 20B, the distance D2b between the printing apparatuses 20A and 20C, and the distance D2c between the printing apparatuses 20A and 20D by using a factory-default reference reception strength value.

The printing apparatus 20A receives or collects the pieces of individual identification information D3a to D3c, the pieces of capability information D4a to D4c, and the pieces of enabled/disabled information D5a to D5c regarding the other printing apparatuses 20B to 20D from the other printing apparatuses 20B to 20D. Then, the printing apparatus 20A reads the pieces of individual identification information D3a to D3c, the pieces of capability information D4a to D4c, and the pieces of enabled/disabled information D5a to D5c from the advertising packets stored in the RAM 22b or any other storage section.

The print station 26 includes an ink jet head (print head) and a paper feed mechanism, both of which are not illustrated in the drawings.

The information processing terminal 30 may be typically a smartphone. However, the information processing terminal 30 is not limited to a specific type of electric device and may be a PC (personal computer), a tablet terminal, or a portable phone, for example.

As illustrated in FIG. 2, main hardware components of the information processing terminal 30 are a second controller 32, a third wireless communication section 34a, the fourth wireless communication section 34b, and a touch screen display 36.

The second controller 32 includes a CPU 32a, RAM 32b, and ROM 32c.

The second controller 32 (CPU 32a) executes a predetermined program, such as an application program, read from the ROM 32c, thereby controlling the entire operation of the information processing terminal 30. The RAM 32b is used as a work area in which the CPU 32a performs various arithmetic processes. The ROM 32c may be a rewritable, nonvolatile memory, such as flash ROM, and store an OS (operating system) and application programs to be executed on the OS.

The third wireless communication section 34a conducts BLE communication and includes a BLE chip, such as a controller, and a BLE module.

The information processing terminal 30 (third wireless communication section 34a) transmits a print job, through BLE communication, to the printing apparatus 20 that has been determined to be an alternative printing apparatus 20 by an alternative printing apparatus determination section 32a1 that will be described later. More specifically, the information processing terminal 30 (third wireless communication section 34a) attempts to establish BLE connection to the alternative printing apparatus 20. If BLE connection to the alternative printing apparatus 20 is successfully established, the information processing terminal 30 (third wireless communication section 34a) transmits a print job to the alternative printing apparatus 20 through BLE communication. The timing at which the information processing terminal 30 (third wireless communication section 34a) attempts to establish BLE connection to the alternative printing apparatus 20 will be described later. Herein, the fourth wireless communication section 34b may be referred to as the Wi-Fi connection section, and the third wireless communication section 34a may be referred to as the BLE connection section.

The fourth wireless communication section 34b conducts Wi-Fi communication with the printing apparatuses 20 (e.g., the printing apparatuses 20A in this embodiment) through the wireless network (wireless LAN) including the relay 50 (access point). Examples of the fourth wireless communication section 34b include a wireless LAN chip, such as a controller, and a wireless LAN module.

The information processing terminal 30 (fourth wireless communication section 34b) transmits a print job to the printing apparatuses 20 (e.g., the printing apparatuses 20A in this embodiment) through Wi-Fi communication.

The information processing terminal 30 (fourth wireless communication section 34b) receives the alternative printing apparatus determination information D (see FIG. 4) transmitted from a printing apparatus 20 (e.g., printing apparatus 20A in this embodiment) that has failed to perform a printing process, through Wi-Fi communication. Herein, the fourth wireless communication section 34b corresponds to a distance receiving section (distance information receiving section). The received alternative printing apparatus determination information D is stored in the RAM 32b or any other storage section in the information processing terminal 30.

When the information processing terminal 30 (alternative printing apparatus determination section 32a1) receives the alternative printing apparatus determination information D transmitted from a printing apparatus 20 (e.g., printing apparatus 20A in this embodiment) that has failed to perform a printing process, the information processing terminal 30 (alternative printing apparatus determination section 32a1) detects or identifies the printing apparatuses 20B to 20D as printing apparatuses having the greatest capability, on the basis of the pieces of capability information D4a to D4c regarding the other printing apparatuses 20B to 20D, respectively, contained in the received alternative printing apparatus determination information D.

Then, on the basis of the distance D2a between the printing apparatuses 20A and 20B, the distance D2b between the printing apparatuses 20A and 20C, and the distance D2c between the printing apparatuses 20A and 20D which are contained in the alternative printing apparatus determination information D, the information processing terminal 30 (alternative printing apparatus determination section 32a1) determines which of the detected printing apparatuses has the shortest distance to the printing apparatus 20A and designates the selected printing apparatus as an alternative printing apparatus 20. The function of the alternative printing apparatus determination section 32a1 is realized by the second controller 32 (CPU 32a) executing a predetermined program, such as the control program, read from the ROM 32c.

Then, the information processing terminal 30 (fourth wireless communication section 34b) attempts to establish Wi-Fi connection to the alternative printing apparatus 20 determined by the alternative printing apparatus determination section 32a1. If Wi-Fi connection to the alternative printing apparatus 20 is successfully established, the information processing terminal 30 (fourth wireless communication section 34b) transmits a print job to the alternative printing apparatus 20 through Wi-Fi communication. In this case, the fourth wireless communication section 34b corresponds to a print job transmitting section herein.

The touch screen display 36 is a display unit with a touch panel and serves as both an input section and a display section.

Next, a description will be given of an example of an operation of the printing system 10 in this embodiment, with reference to FIG. 6.

Figure 6:
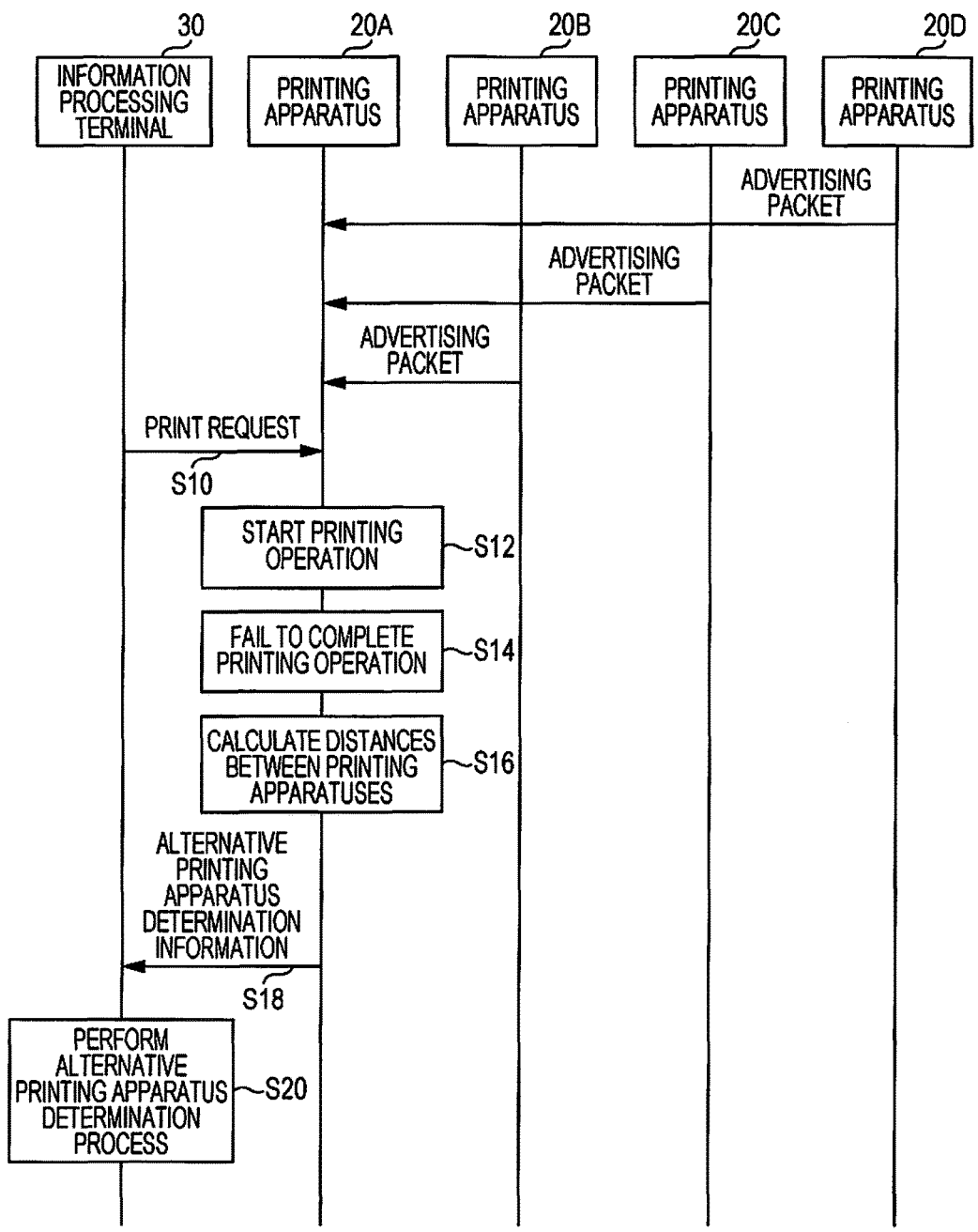
FIG. 6 is a sequence diagram of a process performed when the printing apparatus receives a print request from the information processing terminal via a wireless network (wireless LAN) including the relay (access point) but fails to perform a printing process due to paper or ink depletion or an occurrence of hardware trouble.

FIG. 6 is a sequence diagram of a process performed when a printing apparatus 20 receives a print request from the information processing terminal 30 through the wireless network (wireless LAN) including the relay 50 (access point) but fails to perform a printing process due to ink or paper depletion or an occurrence of hardware trouble.

In the example described below, the printing apparatus 20A receives a print request from the information processing terminal 30, and the other printing apparatuses 20B to 20D are present near the printing apparatus 20A.

Moreover, as illustrated in FIG. 6, the other printing apparatuses 20B to 20D (first wireless communication sections 24a) transmit advertising packets (see FIG. 3) to the information processing terminal 30 at regular intervals through BLE communication. Then, the printing apparatus 20A (first wireless communication section 24a) receives these advertising packets. The received advertising packets are stored in the RAM 22b or any other storage section in the printing apparatus 20A.

At Step S10, first, a user activates an application program in the information processing terminal 30 and then transmits a print request to the printing apparatus 20A. More specifically, the user causes the information processing terminal 30 (fourth wireless communication section 34b) to transmit the print request to the printing apparatus 20A through Wi-Fi communication.

The printing apparatus 20A (second wireless communication section 24b) receives the print job transmitted from the information processing terminal 30 (fourth wireless communication section 34b) through Wi-Fi communication. In response to the reception of the print job, at Step S12, the printing apparatus 20A controls the print station 26 and starts a printing process.

At Step S14, the printing apparatus 20A fails to complete the printing process. More specifically, before completing the printing process, the printing apparatus 20A detects the depletion of ink or paper or an occurrence of hardware trouble.

The first wireless communication section 24a in the printing apparatus 20A receives advertising packets (broadcast signals) transmitted from the other printing apparatuses 20B to 20D through BLE communication. At Step S16, then, the distance calculation section 22a2 in the printing apparatus 20A calculates the distance D2a between the printing apparatuses 20A and 20B, the distance D2b between the printing apparatuses 20A and 20C, and the distance D2c between the printing apparatuses 20A and 20C, on the basis of the reception strengths of the received advertising packets (broadcast signals).

The printing apparatus 20A generates the alternative printing apparatus determination information D (see FIG. 4). This generation is based on: the individual identification information D3a regarding the other printing apparatus 20B, the individual identification information D3b regarding the other printing apparatus 20C, and the individual identification information D3c regarding the other printing apparatus 20D which are contained in the advertising packets stored in the RAM 22b or any other storage section in the printing apparatus 20A; the pieces of capability information D4a to D4c; the pieces of enabled/disabled information D5a to D5c; and the calculated distance D2a to D2c between the printing apparatus 20A and the individual other printing apparatuses 20B to 20D. At Step S18, then, the printing apparatus 20A transmits the generated alternative printing apparatus determination information D to the information processing terminal 30 through Wi-Fi communication.

The information processing terminal 30 (fourth wireless communication section 34b) receives the alternative printing apparatus determination information D transmitted from the printing apparatus 20A through Wi-Fi communication. The received alternative printing apparatus determination information D is stored in the RAM 32b or any other storage section in the information processing terminal 30. At Step S20, then, the information processing terminal 30 (alternative printing apparatus determination section 32a1) performs an alternative printing apparatus determination process, which will be described with reference to FIG. 7, on the basis of the received alternative printing apparatus determination information D.

Next, an alternative printing apparatus determination process will be described with reference to FIG. 7.

Figure 7:
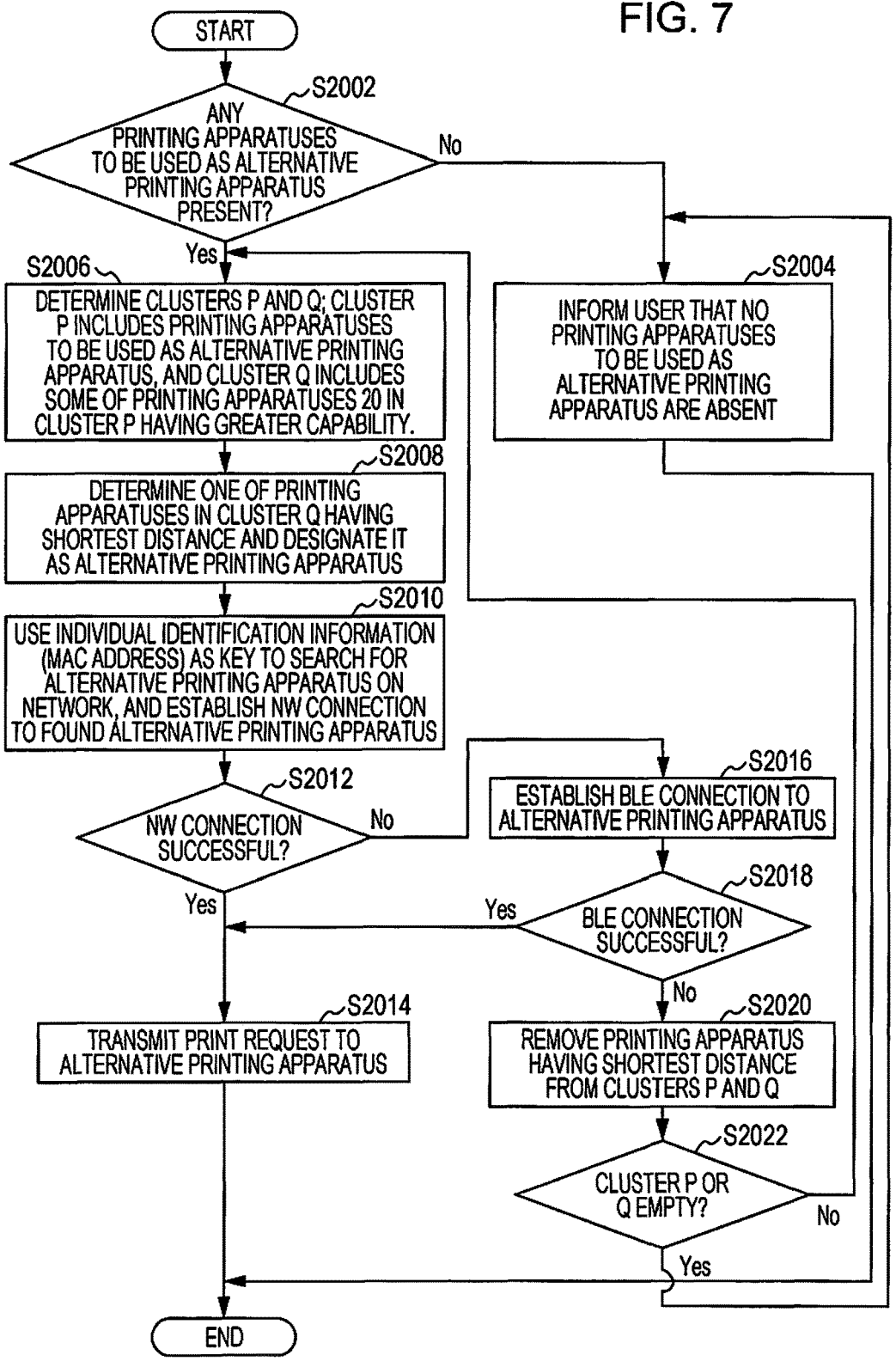
FIG. 7 is a flowchart of an alternative printing apparatus determination process.

FIG. 7 is a flowchart of the alternative printing apparatus determination process.

The alternative printing apparatus determination process is performed by the alternative printing apparatus determination section 32a1 in the information processing terminal 30. In this alternative printing apparatus determination process, it is determined which of the other printing apparatuses 20B to 20D is to be used as the alternative printing apparatus 20 that performs a printing process instead of the defective printing apparatus 20A. The function of the alternative printing apparatus determination section 32a1 is realized by the second controller 32 (CPU 32a) executing a predetermined program, such as the control program, read from the ROM 32c.

First, when receiving the alternative printing apparatus determination information D transmitted from the printing apparatus 20A, the information processing terminal 30 refers to the pieces of enabled/disabled information D5a to D5c contained in the alternative printing apparatus determination information D, and then determines whether any of the other printing apparatuses 20 which can be used as an alternative printing apparatus 20 is present, at Step S2002.

For example, if the information (bits or a bit sequence) contained in the alternative printing apparatus determination information D stored in the RAM 32b or any other storage section indicates that all of the other printing apparatuses 20B to 20D are unavailable, the information processing terminal 30 determines that no printing apparatuses 20 that can be used as an alternative printing apparatus 20 are present (No at Step S2002).

When the determination result at Step S2002 is No, the information processing terminal 30 informs a user that the alternative printing apparatus 20 is absent by displaying the message in the touch screen display 36, at Step S2004. Then, this process is terminated.

If the information (bits or a bit sequence) contained in the alternative printing apparatus determination information D stored in the RAM 32b or any other storage section indicates that one or more of the other printing apparatuses 20B to 20D can be available, the information processing terminal 30 determines that at least one of the other printing apparatuses 20 can be used as an alternative printing apparatus 20 (Yes at Step S2002).

The following description will be given regarding the case where it is determined that at least one of the other printing apparatuses 20B to 20D can be used as an alternative printing apparatus 20.

At Step S2006, the information processing terminal 30 determines clusters P and Q; the cluster P includes other printing apparatuses 20B to 20D that can be used as the alternative printing apparatus 20, and the cluster Q includes some of other printing apparatuses 20 in the cluster P which have the greatest capability. In this case, the information processing terminal 30 may detect the other printing apparatuses 20 having greatest capability in the cluster Q on the basis of the pieces of capability information D4a to D4c regarding the other printing apparatuses 20B to 20D, respectively, contained in the alternative printing apparatus determination information D stored in the RAM 32b or any other storage section.

The following description will be given regarding the case where the printing apparatuses 20B to 20D are detected as the other printing apparatuses 20 having the greatest capability.

At Step S2008, the information processing terminal 30 determines which of the other printing apparatuses 20 in the cluster Q has the shortest distance to the printing apparatus 20A and then designates the determined printing apparatus 20 as the alternative printing apparatus 20. In this case, the information processing terminal 30 may make the determination on the basis of the distance D2a between the printing apparatuses 20A and 20B, the distance D2b between the printing apparatuses 20A and 20C, and the distance D2c between the printing apparatuses 20A and 20D that are contained in the alternative printing apparatus determination information D stored in the storage unit, such as the RAM 32b.

The following description will be given regarding the case where the printing apparatus 20C is determined to have the shortest distance to the printing apparatus 20A. The printing apparatus 20C is referred to below as the alternative printing apparatus 20C.

If only one printing apparatus 20 is detected as the printing apparatus 20 having the greatest capability at Step S2006, namely, if the cluster Q includes only one printing apparatus 20, the information processing terminal 30 (alternative printing apparatus determination section 32a1) may designate this printing apparatus 20 as the alternative printing apparatus 20.

At S2010, the information processing terminal 30 (fourth wireless communication section 34b) sets, as a key, the individual identification information (MAC address) regarding the alternative printing apparatus 20C which is contained in the alternative printing apparatus determination information D stored in the RAM 32b or any other storage section. Using this key, the information processing terminal 30 (fourth wireless communication section 34b) searches for the alternative printing apparatus 20C on the network. Then, the information processing terminal 30 (fourth wireless communication section 34b) attempts to establish Wi-Fi connection to the found alternative printing apparatus 20C.

If Wi-Fi connection (NW connection) to the printing apparatus 20C is successfully established (Yes at Step S2012), the information processing terminal 30 (fourth wireless communication section 34b) transmits a print request to the alternative printing apparatus 20C through Wi-Fi connection at Step S2014. In other words, the information processing terminal 30 (fourth wireless communication section 34b) transmits a print job to the alternative printing apparatus 20C through Wi-Fi communication. The print job transmitted through Wi-Fi communication may be reconfigured to cause the alternative printing apparatus 20C to perform the rest of the printing process interrupted by the printing apparatus 20A. Alternatively, the print job transmitted through Wi-Fi communication may be the same as the print job that the information processing terminal 30 has transmitted to the printing apparatus 20A at Step S10.

When receiving the print job transmitted from the information processing terminal 30 (fourth wireless communication section 34b) through Wi-Fi communication, the alternative printing apparatus 20C controls the print station 26 and performs the rest of the print operation interrupted by the printing apparatus 20A, in response to the reception of the print job.

If establishing the Wi-Fi connection (NW connection) to the alternative printing apparatus 20C fails (No at Step S2012), the information processing terminal 30 in turn attempts to establish BLE connection to the alternative printing apparatus 20C at Step S2016.

Figure 8:
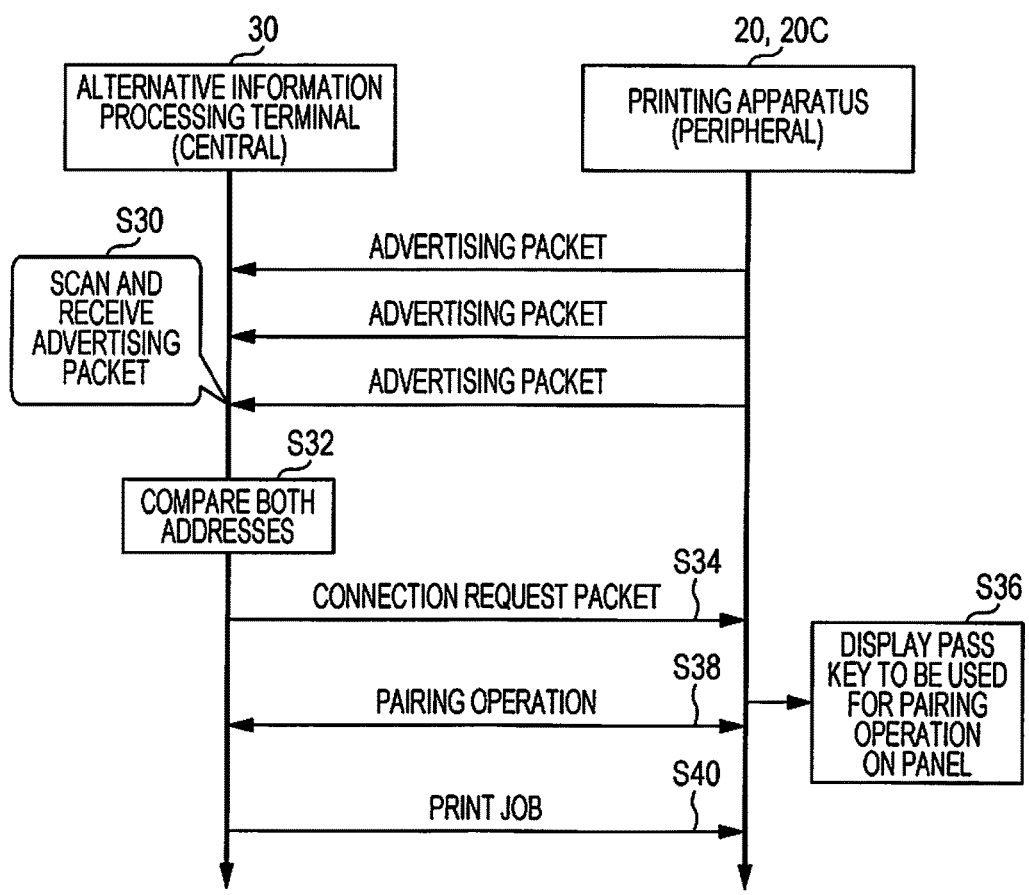
FIG. 8 is a sequence diagram of a BLE connection process.

A description will be given of a process for establishing BLE connection (referred to as a BLE connection process) with reference to FIG. 8. FIG. 8 is a sequence diagram of the BLE connection process.

As illustrated in FIG. 8, the information processing terminal 30 serves as a central (master) in order to make BLE connection to the alternative printing apparatus 20C. At Step S30, first, the information processing terminal 30 scans an advertising packet transmitted from the alternative printing apparatus 20C and then receives the advertising packet.

When receiving the advertising packet, the information processing terminal 30 verifies the individual identification information (MAC address) contained in the advertising packet. More specifically, at Step S32, the information processing terminal 30 compares this individual identification information (MAC address) with the individual identification information (MAC address) regarding the alternative printing apparatus 20C which is contained in the alternative printing apparatus determination information D stored in the RAM 32b or any other storage section. Alternatively, the information processing terminal 30 may compare the Bluetooth device address (BD_ADDR) of the transmission source contained in the advertising packet transmitted from the alternative printing apparatus 20C with the individual identification information (Bluetooth device address (BD_ADDR)) of the alternative printing apparatus 20C which is contained in the alternative printing apparatus determination information D stored in the RAM 32b or any other storage section. If both the MAC or Bluetooth device addresses match each other as a result of the comparison, the information processing terminal 30 (first wireless communication section 24a) transmits a connection request packet to the alternative printing apparatus 20C, at Step S34. This connection request packet may contain the Bluetooth device address (BD_ADDR) of the alternative printing apparatus 20C.

At Step S38, the information processing terminal 30 and the alternative printing apparatus 20C perform a pairing operation in order to establish the connection therebetween. More specifically, the alternative printing apparatus 20C displays a pass key to be used for the pairing operation on its panel (not illustrated), as Step S36. The user moves the alternative printing apparatus 20C together with the information processing terminal 30. Then, the user checks the pass key displayed on the panel of the alternative printing apparatus 20C, and performs the pairing operation at Step S38.

In this way, the pairing operation is completed, and BLE connection is established securely between the information processing terminal 30 and the alternative printing apparatus 20C. As a result, the information processing terminal 30 can communicate with the alternative printing apparatus 20C through BLE communication.

If BLE connection is successfully established between the information processing terminal 30 and the alternative printing apparatus 20C in this manner (Yes at Step S2018), the information processing terminal 30 transmits a print request to the alternative printing apparatus 20C through BLE connection, at Step S2014. In other words, the information processing terminal 30 (fourth wireless communication section 34b) transmits a print job to the alternative printing apparatus 20C through BLE communication, at Step S40. The print job transmitted through BLE communication is reconfigured to cause the alternative printing apparatus 20C to perform the rest of the printing process interrupted by the printing apparatus 20A. Alternatively, the print job transmitted through BLE communication may be the same as the print job that the information processing terminal 30 has transmitted to the printing apparatus 20A at Step S10.

When receiving the print job transmitted from the information processing terminal 30 (third wireless communication section 34a) through BLE communication, the alternative printing apparatus 20C controls the print station 26 and performs the rest of the printing process interrupted by the printing apparatus 20A, in response to the reception of the print job.

If establishing BLE connection to the alternative printing apparatus 20C fails (No at Step S2018), the information processing terminal 30 removes the printing apparatus 20 having the shortest distance to the printing apparatus 20A (alternative printing apparatus 20C in this example) from the clusters P and Q, at Step S2020.

If one or both of the clusters P and Q are empty (Yes at Step S2022), the information processing terminal 30 informs the user that no printing apparatuses 20 that can be the alternative printing apparatuses 20 are present by displaying the message in the touch screen display 36, at Step S2004. Then, this process is terminated.

If neither the cluster P nor Q is empty (No at Step S2022), Steps S2006 to S2022 will be performed again.

As described above, this embodiment provides a printing system 10, a printing apparatus 20, an information processing terminal 30, and a non-transitory computer readable medium. Specifically, when the information processing terminal 30 transmits a print request to the printing apparatus 20, such as the printing apparatus 20A but this printing apparatus 20 fails to perform a printing process due to paper or ink depletion or an occurrence of hardware trouble, the information processing terminal 30 determines which of other printing apparatuses 20 is the most convenient for a user and designates the determined printing apparatus 20 as an alternative printing apparatus 20. Then, the information processing terminal 30 transmits a print job to the alternative printing apparatus 20, thereby causing the alternative printing apparatus 20 to perform the printing process instead of the defective printing apparatus 20. The printing apparatus 20, such as the printing apparatus 20C, determined to be the most convenient for a user may be, for example, one of other printing apparatuses 20, such as the printing apparatuses 20B to 20D, having the greatest capability and may have the shortest distance to the defective printing apparatus 20, such as the printing apparatus 20A, among the other printing apparatuses 20.

More specifically, the alternative printing apparatus determination section 32a1 in the information processing terminal 30 determines which of the other printing apparatuses 20, such as the printing apparatus 20C, is to be used as the alternative printing apparatus 20 that performs the printing process instead of the defective printing apparatus 20, such as the printing apparatus 20A. This determination is based on distances received by the fourth wireless communication section 34b in the information processing terminal 30, and examples of the distances include: the distance D2a between the printing apparatuses 20A and 20B; the distance D2b between the printing apparatuses 20A and 20C; and the distance D2c between the printing apparatuses 20A and 20D.

In this embodiment, when Wi-Fi connection to the alternative printing apparatus 20, such as the printing apparatus 20C, is successfully established, the information processing terminal 30 transmits a print job to the alternative printing apparatus 20 through Wi-Fi communication, thereby causing the alternative printing apparatus 20 to perform a printing process instead of the defective printing apparatus 20. If the alternative printing apparatus 20 and the information processing terminal 30 are not present on the same network, for example, Wi-Fi connection to the alternative printing apparatus 20 cannot be established. In this case, the information processing terminal 30 transmits a print job to the alternative printing apparatus 20 through BLE communication, thereby causing the alternative printing apparatus 20 to perform a printing process instead of the defective printing apparatus 20.

Next, some modifications of this embodiment will be described below.

In the foregoing embodiment, as one example, the printing apparatus 20A receives a print request from the information processing terminal 30 through the wireless network (wireless LAN), and the printing apparatuses 20B to 20D are present near the printing apparatus 20A. However, the invention is not limited to this example.

As an alternative example, any printing apparatus 20 other than the printing apparatus 20A may receive a print request from the information processing terminal 30 through the wireless network (wireless LAN). In addition, any printing apparatuses 20 other than the printing apparatuses 20B to 20D may be present near the printing apparatus 20A.

In the foregoing embodiment, as one example, the information processing terminal 30 detects other printing apparatuses 20, such as the printing apparatuses 20B to 20D, as printing apparatuses 20 having the greatest capability. Then, the information processing terminal 30 determines which of the detected printing apparatuses 20 has the shortest distance to the defective printing apparatus 20, such as the printing apparatus 20A, and designates the determined printing apparatus 20, such as the printing apparatus 20C, as the alternative printing apparatus 20. However, the invention is not limited to this example.

An alternative example, the information processing terminal 30 may skip the detection of printing apparatuses 20 having the greatest capability. Then, the information processing terminal 30 may determine which of the other printing apparatus 20 has the shortest distance to the defective printing apparatus 20 and may designate the determined printing apparatus 20 as the alternative printing apparatus 20.

In this way, even when a printing apparatus 20, such as the printing apparatus 20A, receives a print request from the information processing terminal 30 but fails to perform a printing process due to paper or ink depletion or an occurrence of hardware trouble, the information processing terminal 30 can determine which of other printing apparatus 20 is the most convenient for the user and designate this printing apparatus 20, such as the printing apparatus 20C, as the alternative printing apparatus 20. Then, the information processing terminal 30 can transmit a print job to the alternative printing apparatus 20, thereby causing this alternative printing apparatus 20 to perform a printing process instead of the defective printing apparatus 20. In this case, the printing apparatus 20, such as the printing apparatus 20C, that is the most convenient for the user may be the printing apparatus 20 having the shortest distance to the defective printing apparatus 20.

As an alternative example, the information processing terminal 30 may detect other printing apparatuses 20, such as the printing apparatuses 20B to 20D, that have the greatest capability. Then, the information processing terminal 30 may create the list (not illustrated) of some of the detected printing apparatuses 20 whose distances to the defective printing apparatus 20, such as the printing apparatus 20A, are shorter than a predetermined distance. The information processing terminal 30 may provide the user with this list by displaying the list in the touch screen display 36. In this case, the user may select one of the printing apparatuses 20 in the list by using the touch screen display 36. Then, in accordance with the user's operation, the information processing terminal 30 may designate the selected printing apparatus 20 as the alternative printing apparatus 20.

In this way, even when a printing apparatus 20, such as the printing apparatus 20A, receives a print request from the information processing terminal 30 but fails to perform a printing process due to paper or ink depletion or an occurrence of hardware trouble, the information processing terminal 30 can determine which of other printing apparatuses 20 is the most convenient for the user and can designate the determined printing apparatus 20, such as the printing apparatus 20C, as the alternative printing apparatus 20. Then, the information processing terminal 30 can transmit a print job to the alternative printing apparatus 20, thereby causing the alternative printing apparatus 20 to perform the printing process instead of the defective printing apparatus 20. In this case, for example, the other printing apparatus 20 selected by the user's operation may be the alternative printing apparatus 20, which is the printing apparatus 20, such as the printing apparatus 20C, that is the most convenient for the user.

In the foregoing embodiment, as an example, the information processing terminal 30 is provided with the alternative printing apparatus determination section 32a1 that determines the alternative printing apparatus 20. In addition, the information processing terminal 30 (fourth wireless communication section 34b) transmits a print job to the determined alternative printing apparatus 20. However, the invention is not limited to this example.

As an alternative example, the printing apparatus 20A may be provided with the alternative printing apparatus determination section 32a1 that that determines the alternative printing apparatus 20. In addition, the printing apparatus 20A (second wireless communication section 24b) may transmit a print job to the determined alternative printing apparatus 20.

In the foregoing embodiment, as an example, the type of advertising packets transmitted from each printing apparatus 20 (first wireless communication section 24a) is ADV_IND to be intended to establish a connection. However, the invention is not limited to this example. As an alternative example, the type of advertising packets transmitted from each printing apparatus 20 (first wireless communication section 24a) may be ADV_NONCONN_IND to be not intended to establish a connection.

In the foregoing embodiment, as an example, the individual identification information D3 regarding each printing apparatus 20 is a MAC address. However, the invention is not limited to this example. As an alternative example, the individual identification information D3 regarding each printing apparatus 20 may be the Bluetooth device address (BD_ADDR).

When a printing apparatus 20 fails to perform a printing process, the information processing terminal 30 may determine whether to cause another printing apparatus 20 to perform this printing process, depending on the cause of this printing failure. For example, after performing Step 14 in FIG. 6, the printing apparatus 20A may determine whether it is possible to easily eliminate the cause of the printing failure. If it is determined that it is possible to easily eliminate the cause of the printing failure, the information processing terminal 30 does not have to cause another printing apparatus 20 to perform the printing process. However, if it is determined that it is difficult to eliminate the cause of the printing failure, the information processing terminal 30 may cause another printing apparatus 20 to perform the printing process. Examples of causes of a printing failure which it is possible to easily eliminate include paper depletion. Examples of causes of a printing failure which it is difficult to eliminate include ink depletion and hardware troubles. The reason why such control is performed is that, if a cause of a printing failure may be easily eliminated, for example by adding paper sheets, some users consider that it is more convenient to cope with this printing failure than to cause another printing apparatus 20 to perform a printing process.

In the foregoing embodiment, as an example, an ink jet printer is used as each printing apparatus 20. However, the invention is not limited to this example. Any given type of printer, such as a laser printer or a thermal printer, may be used.

All of the numeric values described in the foregoing embodiment are examples, and obviously other numeric values may be used as appropriate.

It is understood that the foregoing embodiment and the modifications are examples in every respect. Therefore, the descriptions of the embodiment and modifications should not be construed restrictively. It is to be noted that the invention can be implemented in various forms without departing from its sprits and primary characteristics.

The entire disclosure of Japanese Patent Application No. 2016-165510, filed Aug. 26, 2016 is expressly incorporated by reference herein.

What is claimed is:

1. A printing system comprising:
an information processing terminal; and
a printing apparatus connected to the information processing terminal over a network, the printing apparatus including:
a broadcast signal receiving section that receives broadcast signals transmitted from other printing apparatuses through short distance wireless communication;
a distance calculation section that calculates respective distances between the printing apparatus and the other printing apparatuses, on the basis of reception strengths of the broadcast signals received by the broadcast signal receiving section; and
a distance information transmitting section that transmits distance information indicating the distances calculated by the distance calculation section to the information processing terminal,
the information processing terminal including:
a distance information receiving section that receives the distance information transmitted from the distance information transmitting section;
an alternative printing apparatus determination section that determines which of the other printing apparatuses is to be used as an alternative printing apparatus that performs a printing process instead of the printing apparatus, on the basis of the distance information received by the distance information receiving section; and
a print job transmitting section that transmits a print job to the alternative printing apparatus determined by the alternative printing apparatus determination section.

2. The printing system according to claim 1, wherein
the information processing terminal includes a Wi-Fi connection section that establishes Wi-Fi connection, and a BLE connection section that establishes BLE connection,
the Wi-Fi connection section attempts to establish Wi-Fi connection to the alternative printing apparatus determined by the alternative printing apparatus determination section,
the BLE connection section attempts to establish BLE connection to the alternative printing apparatus if the Wi-Fi connection section fails to establish Wi-Fi connection to the alternative printing apparatus, and
if Wi-Fi connection to the alternative printing apparatus is successfully established, the print job transmitting section transmits the print job to the alternative printing apparatus through Wi-Fi communication, and
if BLE connection to the alternative printing apparatus is successfully established, the print job transmitting section transmits the print job to the alternative printing apparatus through BLE communication.

3. The printing system according to claim 1, wherein
the alternative printing apparatus determination section determines which of the other printing apparatuses has the shortest distance to the printing apparatus and designates the determined printing apparatus as the alternative printing apparatus.

4. The printing system according to claim 3, wherein
each of the broadcast signals transmitted by the other printing apparatuses contains capability information that indicates a capability of a corresponding one of the other printing apparatuses,
the printing apparatus includes a capability information transmitting section that transmits the capability information contained in each broadcast signal to the information processing terminal,
the information processing terminal includes a capability information receiving section that receives the capability information transmitted from the capability information transmitting section, and
the alternative printing apparatus determination section identifies a cluster of some of the other printing apparatuses which have the greatest capability on the basis of the capability information, then determines which of the other printing apparatuses included in the cluster has the shortest distance to the printing apparatus, and designates the determined printing apparatus as the alternative printing apparatus.

5. The printing system according to claim 1, wherein each of the broadcast signals transmitted by the other printing apparatuses contains capability information that indicates a capability of a corresponding one of the other printing apparatuses, the printing apparatus includes a capability information transmitting section that transmits the capability information contained in each broadcast signal to the information processing terminal, the information processing terminal includes a capability information receiving section that receives the capability information transmitted from the capability information transmitting section, the alternative printing apparatus determination section identifies a cluster of some of the other printing apparatuses which have the greatest capability on the basis of the capability information, then provides a user with a list of some of the other printing apparatuses included in the cluster whose distances to the printing apparatus are shorter than a predetermined distance, and designates one of the other printing apparatuses in the provided list which is selected by a user's operation, as the alternative printing apparatus.

6. The printing system according to claim 1, wherein the distance calculation section calculates the respective distances between the printing apparatus and the other printing apparatuses on the basis of the reception strengths of the broadcast signals received by the broadcast signal receiving section and a reference reception strength of the broadcast signals.

7. The printing system according to claim 1, wherein the short distance wireless communication is communication conforming to Bluetooth Low Energy.

8. A printing apparatus that, if failing to perform a printing process based on a print job received from an information processing terminal, causes one of other printing apparatuses to perform the printing process instead of the printing apparatus itself, the printing apparatus comprising:
a broadcast signal receiving section that receives broadcast signals transmitted from the other printing apparatuses through short distance wireless communication;
a distance calculation section that calculates respective distances between the printing apparatus itself and the other printing apparatuses, on the basis of reception strengths of the broadcast signals received by the broadcast signal receiving section;
an alternative printing apparatus determination section that determines which of the other printing apparatuses is to be used as an alternative printing apparatus that performs the printing process instead of the printing apparatus itself, on the basis of distance information indicating the distances calculated by the distance calculation section; and
a print job transmitting section that transmits a print job to the alternative printing apparatus determined by the alternative printing apparatus determination section.

9. An information processing terminal comprising:
a distance information receiving section that receives distance information indicating respective distances between a printing apparatus and other printing apparatuses, the distance information being transmitted from the printing apparatus;
an alternative printing apparatus determination section that determines which of the other printing apparatuses is to be used as an alternative printing apparatus that performs a printing process instead of the printing apparatus, on the basis of the distance information received by the distance information receiving section; and
a print job transmitting section that transmits a print job to the alternative printing apparatus determined by the alternative printing apparatus determination section.

10. A non-transitory computer readable medium on which a program is stored, the program causing an information processing terminal that communicates with a printing apparatus to function as:
a distance information receiving section that receives distance information indicating respective distances between the printing apparatus and other printing apparatuses, the distance information being transmitted from the printing apparatus;
an alternative printing apparatus determination section that determines which of the other printing apparatuses is to be used as an alternative printing apparatus that performs a printing process instead of the printing apparatus, on the basis of the distance information received by the distance information receiving section; and
a print job transmitting section that transmits a print job to the alternative printing apparatus determined by the alternative printing apparatus determination section.

11. A method of, if a printing apparatus fails to perform a printing process based on a print job received from an information processing terminal, causing one of other printing apparatuses to perform the printing process instead of the printing apparatus, the method comprising:
receiving broadcast signals transmitted from the other printing apparatuses through short distance wireless communication;
calculating respective distances between the printing apparatus and the other printing apparatuses on the basis of reception strengths of the received broadcast signals;
determining which of the other printing apparatuses is to be used as an alternative printing apparatus that performs a printing process instead of the printing apparatus, on the basis of distance information indicating the calculated distances; and
transmitting a print job to the determined alternative printing apparatus.

12. A method comprising:
receiving distance information indicating respective distances between a printing apparatus and other printing apparatuses, the distance information being transmitted from the printing apparatus;
determining which of the other printing apparatuses is to be used as an alternative printing apparatus that performs a printing process instead of the printing apparatus, on the basis of the received distance information; and
transmitting a print job to the determined alternative printing apparatus.

* * * * *